J. G. STIDDER.
TIRE FOR ROAD VEHICLES.
APPLICATION FILED JAN. 14, 1911.
1,114,306.
Patented Oct. 20, 1914.
2 SHEETS—SHEET 1.
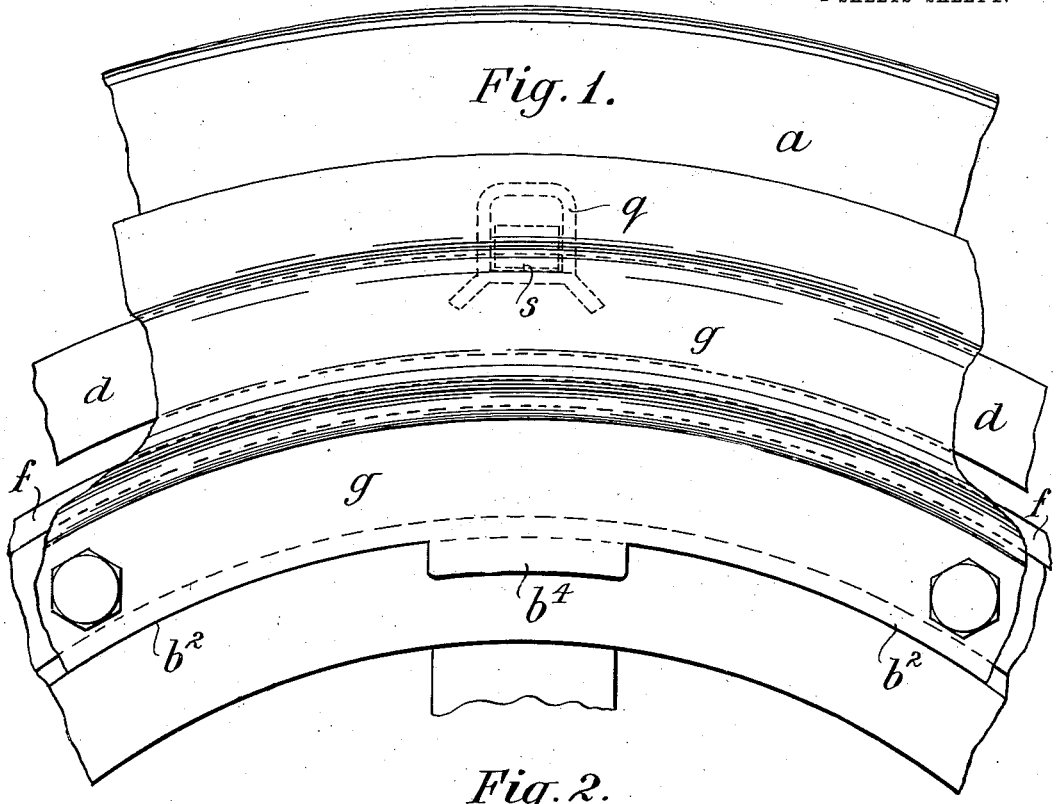
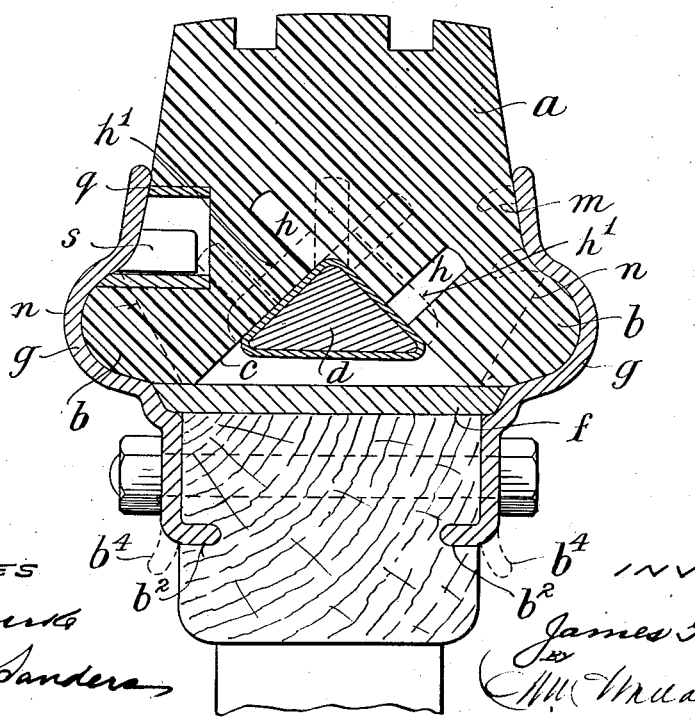

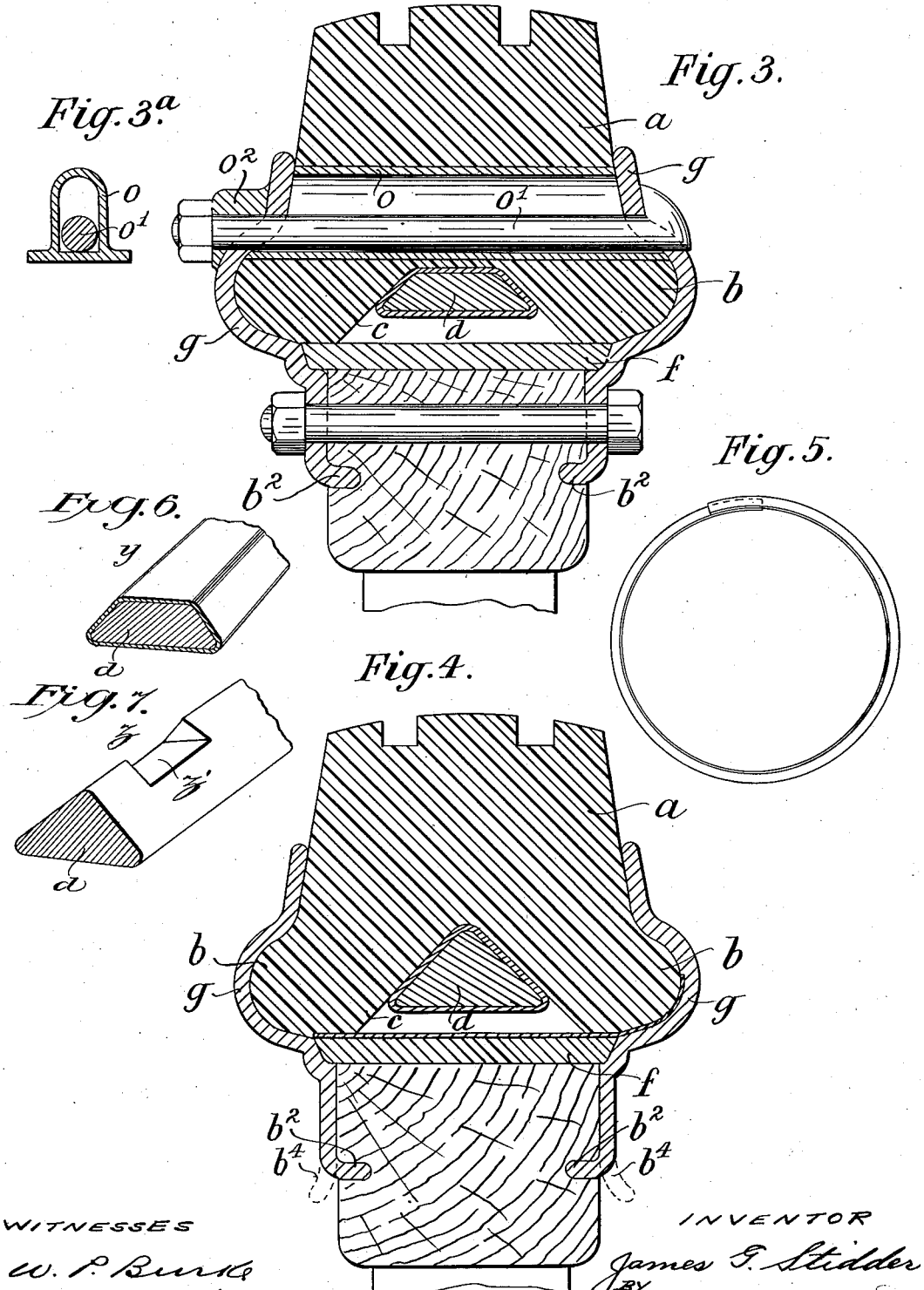

UNITED STATES PATENT OFFICE.

JAMES GEORGE STIDDER, OF HARROW, ENGLAND.

TIRE FOR ROAD-VEHICLES.

1,114,306.  Specification of Letters Patent.  Patented Oct. 20, 1914.

Application filed January 14, 1911.  Serial No. 602,621.

*To all whom it may concern:*

Be it known that I, JAMES GEORGE STIDDER, of 48 Roxburgh Park, Harrow, Middlesex, England, engineer, have invented certain new and useful Improvements in or Relating to Tires for Road-Vehicles, of which the following is a specification.

This invention relates to tires for road vehicles and has for its object to provide a tire of the solid rubber type having a generally improved construction with increased resiliency and security of attachment over the ordinary types.

According to this invention the base of the solid rubber tire is formed with a groove of triangular or other suitable section or is suitably split or divided and in the groove or split is placed a ring of harder rubber or material of smaller dimensions than the groove and adapted to be floating therein between the tire and the rim until compression of the tire takes place. The arrangement is such that while the groove imparts resiliency to the tire, when the weight is on the tire the floating ring acts as a wedge adapted to exert lateral pressure on the divided parts of the tire and so press the same against the sides of the rim, thereby firmly securing the tire in position this action being rendered more effective by providing beads on the lower edges of the tire and corresponding recesses or grooves in the rim or side plates. In an equivalent manner the section of the tire may be splayed out at the base into a rim or side plates of correspondingly splayed or broadened form.

The accompanying drawings illustrate two constructions made in accordance with this invention.

Figures 1 and 2 are part side view and cross section respectively of one construction. Fig. 3 is a cross section showing a modified construction. Fig. 3ᵃ is a detail sectional view taken on the plane extending through a stay tube $o$ and bolt $o'$. Fig. 4 is a cross section showing with the detail view Fig. 5 a method of placing the improved tire on the wheel rim. Figs. 6 and 7 represent modified forms of the ring.

In Figs. 1 and 2 the outer part $a$ of the rubber tire is of usual section with a large semi-circular bead $b$ running along the lower part at each side. The base of the tire is recessed with a large triangular groove $c$ in which is placed a ring $d$ of correspondingly triangular section made of hard rubber and canvas the said ring being of such dimensions and circumference as to lie with a space between it and the periphery of the rim $f$ except that part which is subject to the weight of the vehicle. In this way the resiliency of the tire due both to the rubber material of the tire and to the groove is allowed to have free play before the triangular ring $d$ comes into contact with the rim $f$ and exerts the wedging action which causes the divided part of the tire to be firmly gripped by the rim or side plates $g\ g$ while the resiliency is well maintained. If required the resiliency of the tire may be increased by providing a number of grooved pockets or cavities such as $h\ h'$ formed in the substance of the tire and suitably spaced apart around the circumference of the groove. These pockets $h\ h'$ may if required, open on to the surface of the ring as shown so as to be closed thereby when the weight is on the tire whereby the imprisoned air will impart increased resiliency. Although two forms of pockets are illustrated one form may be chosen and they may be of other shapes if required.

Fig. 3 shows a modification adapted for use in heavy vehicles where the side strains and other stresses on the tire are heavy. In this construction a series of transverse stay tubes $o$ of suitable cross section such as that shown in Fig. 3ᵃ are provided, in these tubes $o$ through bolts $o'$ are placed adapted to clamp the side plates $g\ g$ together near their peripheral edge. The said side plates will preferably be provided with lugs or sockets such as $o^2$ for receiving bolts. The internal wedging ring $d$ may be suitably flattened as shown, throughout its length, or flattened or reduced parts may be provided only where the cross stay tubes are disposed. The side plates $g\ g$ may have their inner edges flanged over into grooves in the felly as shown at $b^2\ b^2$ for strength of construction. Figs. 2, 3 and 4 and parts $b^4$ may be slightly turned outward at the edge as shown in dotted lines, to allow of the side plates being readily detached by placing a suitable tool thereunder. If required for further security against displacement by lateral strains the side plates may be provided with ears or projections $m\ m$ Fig. 2 of slightly hooked or inclined form adapted to engage with corresponding recesses or pockets in the sides of the tire. Further to prevent jumping or creeping the recesses in which the beads on the tires fit may be provided with projections such as *n n* suitably spaced apart.

In order to prevent creeping of the tire I may provide the same with socket and pin devices such as shown in Figs. 1 and 2 where *q* is a socket embedded in the tire preferably when the same is being made. Into the recess *q* fits a pin or lug *s* formed upon the side plate. The socket is made larger than the pin in a radial direction but a close fit in a circumferential direction whereby the socket is allowed ample but limited movement in regard to the pin under the resilient movements of the tire but circumferential movement is prevented, this arrangement prevents both creeping and jumping without interfering with the resiliency. Further, to facilitate the placing of the tire in position with or without the registering pin mentioned I may slip the same on to a circular plate formed with overlapping ends so as to be expansible as shown in Fig. 5. This plate keeps the tire thereon in circular shape and the plate with the tire thereon is slipped sidewise on to the rim of the wheel and may be allowed to remain as shown in Fig. 4 and it may come away with the tire when removed. This permits of the tire being forced tightly on to the rim.

What I claim as my invention and desire to secure by Letters Patent is:—

For road vehicles a tire of solid rubber or equivalent material having its base broadened out and formed with a groove of suitable section so as to be divided at the base, in combination with a wedging ring of smaller sectional area than the said groove and adapted to be floating or free therein between the tire and the rim until compression of the tire takes place, side plates on the felly having grooves or recesses formed therein for receiving the broadened out and divided parts of the tire base, and corresponding projections and lined recesses such as *q* and *s* formed in the tire and side plates for preventing jumping or creeping.

In witness whereof, I have hereunto signed my name in the presence of two subscribing witnesses.

JAMES GEORGE STIDDER.

Witnesses:
 HENRY ALLEN PRYER,
 ROBERT MILTON SPEARPOINT.